April 26, 1966  B. W. BURNS  3,247,635
CONNECTION FOR ABUTTING WOOD MEMBERS
Filed May 7, 1962  2 Sheets-Sheet 1
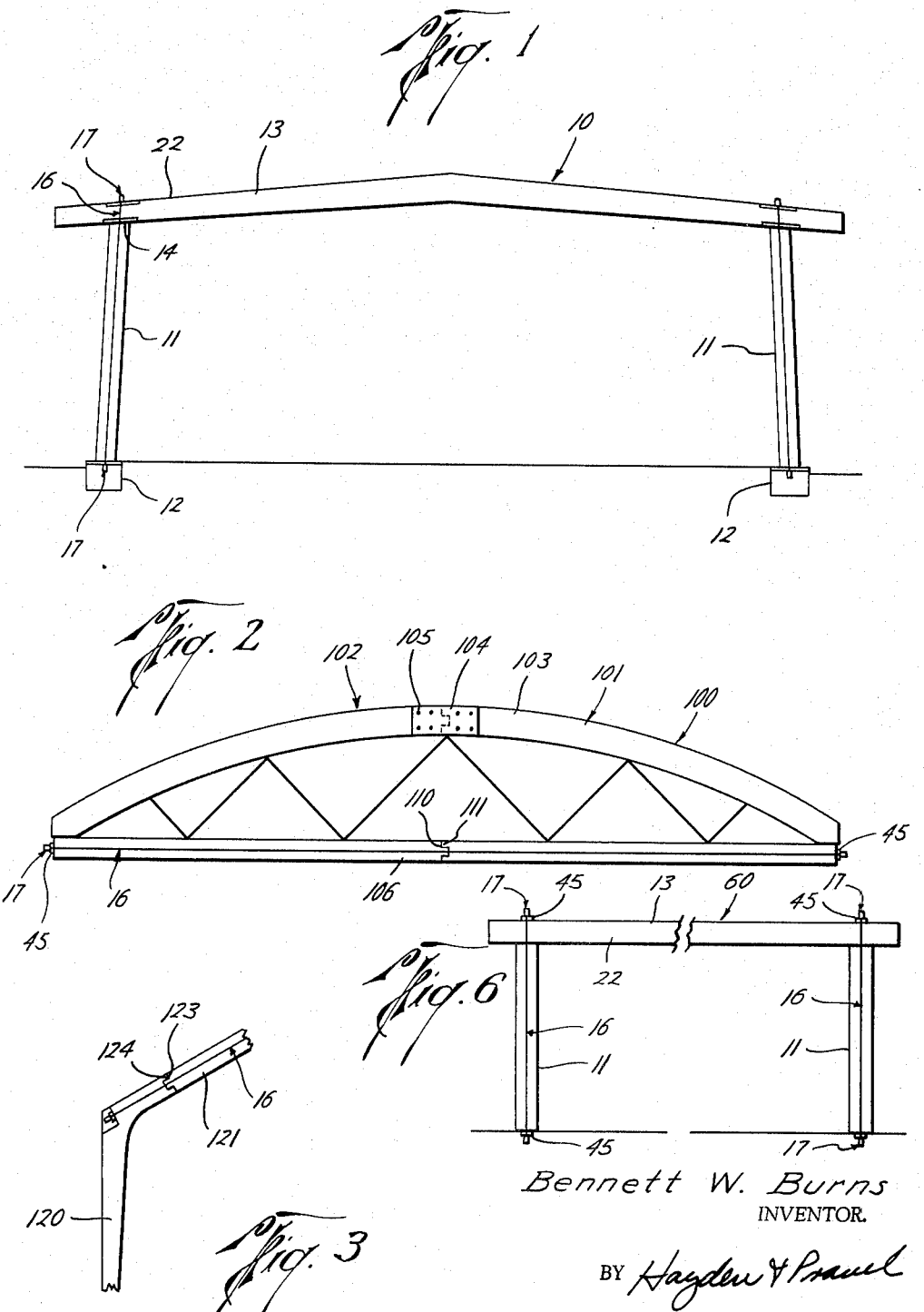
Bennett W. Burns
INVENTOR.
BY Hayden & Pravel
ATTORNEYS

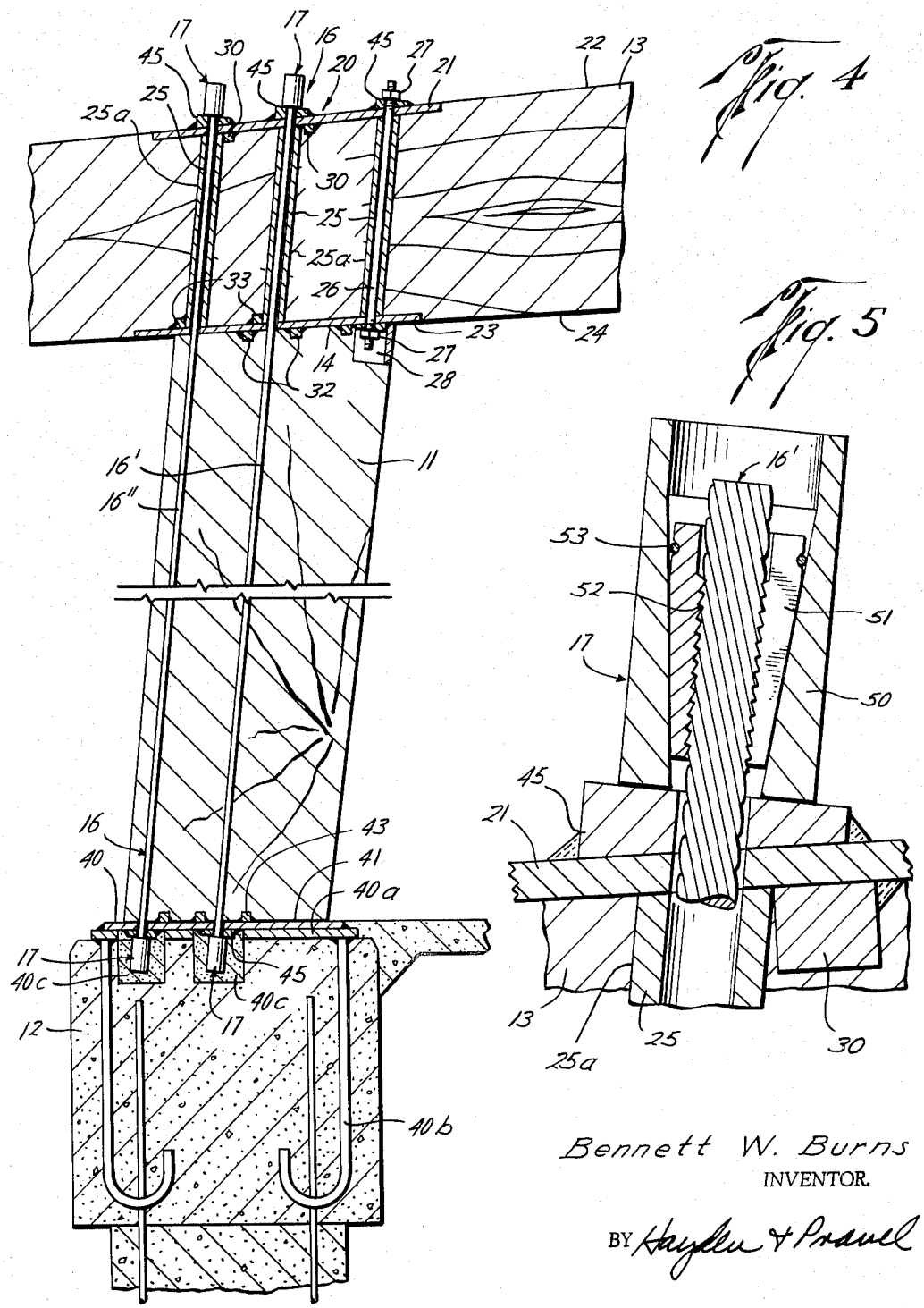

United States Patent Office

3,247,635
Patented Apr. 26, 1966

3,247,635
CONNECTION FOR ABUTTING WOOD
MEMBERS
Bennett W. Burns, Tennessee Bldg., Houston 2, Tex.
Filed May 7, 1962, Ser. No. 192,898
6 Claims. (Cl. 52—223)

The present invention relates to a connection, and more particularly, to a connection for retaining abutting wood members in compression at their abutting juncture.

In various structural arrangements in use at the present time, expensive and bulky connections are required for retaining abutting wood members in connected relationship. Also, such connections are formed for structural reasons to provide strength and rigidity at the abutting juncture of the wood members. Such connections are extremely expensive and in certain instances are extremely undesirable in design considerations. Additionally, connections in use at the present time for abutting wood members may tend to loosen over a period of time and may loosen under the periodic application of lateral forces applied by wind to the structure in which the connection is used or under the vertical forces applied thereto by snow on the roof of the structure in which the connection is used.

The present invention provides a connection for abutting wood members which overcomes the above difficulties presently encountered with connections for wood members without sacrificing any structural strength at the abutting juncture of the wood members.

Also, some structural components formed of wood of substantial size or configuration are extremely difficult to ship or transport for any distance because of their size and configuration. The present invention provides an arrangement whereby such structural members such as bowstring trusses or other irregular and large shaped structural members may be formed in sections and then connected together at the job site without sacrificing any structural strength in the member when it is reassembled.

Yet another object of the present invention is to apply a compressive force across the abutting juncture of wood members to retain them in a predetermined fixed relationship.

Still another object of the present invention is to apply a tension across the abutting juncture of wood members to thereby retain the juncture in compression to position the members in a fixed, desired relationship.

Other objects and advantages of the present invention will become more apparent from a consideration of the following description and drawings wherein:

FIG. 1 is an illustration showing a portion of a framework of a structure with the present invention incorporated therein;

FIG. 2 is a representation of a bowstring truss showing the manner of incorporating the present invention therein;

FIG. 3 illustrates a portion of a structural member and the manner in which the present invention may be incorporated therein;

FIG. 4 is an enlargement of a portion of the structural frame of FIG. 1 and shows in greater detail one of the abutting junctures with one form of the present invention incorporated therein;

FIG. 5 illustrates in enlarged detail a form of the anchor means for holding the cables in tension in the connection of the present invention; and FIG. 6 is a diagrammatic view of another structure somewhat similar to that shown in FIG. 1.

Attention is first directed to FIG. 1 of the drawings wherein a portion of the framework of a structure is represented generally by the numeral 10. As illustrated, the framework includes the upright members 11 which are supported at their lower ends in any suitable manner on a foundation represented by the numeral 12. It can be appreciated that a plurality of upright members 11 will be provided in the structure and will be spaced at suitable intervals to provide support for the laterally extending roof support members 13 which abut the upper ends 14 of each of the members 11 and the roof structure which in turn is supported by the lateral members 13.

The members 11 and 13 are formed of wood, and suitable means for connecting the members 11 and 13 together at their abutting juncture are provided, which connection means includes the cable illustrated generally by the numeral 16 and is shown as being anchored at the lower end of the member 11 by the anchor means 17 and extending longitudinally of the member 11 and across the member 13 to be anchored on the upper edge 22 thereof by the anchor means 17 which may be similar in construction to the anchor means 17 at the lower end of the member 11. A suitable hole or opening is provided longitudinally of the member 11 and through the member 13 for receiving the cable means 16, and after the cable 16 has been positioned in the member 11 and across member 13, a tension is applied thereto so that the abutting wood members 13 and 11 are held in compression across their abutting juncture, the anchor means 17 serving to hold or retain the cable means 16 in tension in the member 11 and across 13 so that this tension is applied across the abutting juncture of the wood members 11 and 13 which in turn places the members 11 and 13 under compression at their abutting juncture as will be described in greater detail hereinafter.

Attention is now directed to FIGS. 4 and 5 of the drawings wherein the abutting juncture of one of the members 11 and one of the members 13 is illustrated with the other components of one form of the present invention shown in somewhat greater detail. It will be noted that the member 11 as illustrated in FIG. 1 of the drawings and as again illustrated in FIG. 4 of the drawings is represented as extending upwardly from the foundation 12 at an angle relative to the vertical and that the member 11 at its upper end 14 abuts the edge 24 of the member 13 at substantially a right angle.

In order to position the members 11 and 13 relative to each other as the connection of the present invention is formed and also to inhibit mashing or collapsing of the member 13 by reason of the force applied across its grain by the cable 16 when tenison is applied thereto, a suitable support arrangement designated generally by the numeral 20 is provided. The support 20 is shown in FIG. 4 of the drawings as including a plate 21 which extends a suitable distance along the top edge 22 of the wood member 13 and a plate 23 which extends along the bottom edge 24 of the wood member 13. If desired a suitable recess may be provided in the edges 22 and 24 for receiving the plates 21 and 23, respectively, to aid in inhibiting slipping or sliding of the plates along the edges 22 and 24 as the connection is formed between members 11 and 13 as will be described hereinafter. Also, to further inhibit movement of the plates 21 and 23 relative to the member 13 and relative to the member 11 as tension is applied to the cable 16 to form the connection of the present invention, ribs 30 may be provided on the bottom of plate 21, which ribs fit in recesses that extend across the edge 22 of the member 11 as shown in the drawing. Similarly, ribs 33 are provided on the plate 23 which fit in conforming recesses in the edge 24 of member 11 and ribs 32 on plate 23 are adapted to fit within recesses formed in the upper end 14 of member 11 as shown in FIG. 4 of the drawings. Hollow tubular members 25 extend through openings 25a formed in member 13 between the plates 21 and 23 as shown in the drawings to provide further support and inhibit collapsing of the member 13 as tension is applied to the cable 16. As shown in the drawings, it will be noted that there are three openings 25a through the member 13 with a hollow tubular member 25 positioned in each opening or hole. In one of the tubular members 25 there is positioned a bolt 26 with a nut 27 on each end thereof which may be used to serve as initially positioning the plates 21 and 23 and tubular members 25 in position on the wood member 13. If necessary, a suitable recess 28 may be provided in the member 11 for receiving one end of the bolt and the nut 27 as shown in FIG. 4 of the drawings.

The edges 24 of the member 13, and more particularly, the plate 23 on the edge 24 abuts the upper end 14 of the member 11 as shown in the drawings when the member 13 and member 11 are positioned to form the framework 10 of the structure. The lower end 41 of the member 11 rests on the foundation 12, and abutting the lower end 41 is a plate 40 which is provided with ribs 43 secured thereto by any suitable means such as welding or the like which fit within conforming recesses in the lower end 41 of the member 11 to inhibit slipping between the plate 40 and the member 11 as the cable 16 is tightened.

The plate 40 in turn is carried on a plate 40a and may be welded thereto if desired, the plate 40a in turn being welded to the steel reinforcing 40b forming a part of the concrete foundation 12. Suitable recesses 40c are provided for receiving the anchor means 17 connected on the lower end of each of the cables 16' and 16".

The cables 16' and 16" extend upwardly and longitudinally of the member 11 through suitable openings provided therein and through openings which are provided in the plate 23 and then through the tubular member 25 and through openings formed in the plate 21 to be engaged by the anchoring means 17 supported on the collars 45 secured and surrounding the openings in the plate as illustrated in FIG. 4 of the drawings.

In practicing the present invention, the members 11 and 13 may be initially abutted and connected together on the ground and then positioned on the foundation 12, or the members 11 may be initially positioned on the foundation 12 and the members 13 supported on their upper ends and secured or connected thereto as will be described. For purposes of illustration, it will be assumed that the members 11 are to be initially positioned on the foundation 12, in which event the cables 16' and 16" will be extended through the member 11 and engaged by the anchor means 17, which anchor means is carried on the washers 45 that are shown as being welded to the plate 40. The anchor means 17 grasps or engages the lower end of each of the cables, and the cables 16' and 16" will each be of sufficient length so that they will extend above the member 13 a suitable distance so that they can be engaged by jack means to apply a tension thereto. The plates 21 and 33 may be initially positioned on the member 13, and the member 13 then hoisted into position above the member 11 whereupon the cables 16' and 16" may be threaded through the tubular members 25 and connected to their respective anchor means 17. The member 13 is then lowered onto the top edge 14 of the member 11, and a tension is then applied to each of the cable means 16' and 16" by any suitable jack construction which can grasp the cable and exert a pull thereon. While the cable is in tension, a hammer or other means may be used to position the segmented jaws 51 in the cylindrical housing 50 of the anchor means 17 so as to grasp or hold the cable 16' and cable 16" under tension. The tension in each of the cables 16' and 16" will apply a compressive force at the abutting juncture of the upper edge 14 of the member 11 and the lower edge 24 of the member 13 and will connect the members 11 and 13 together. After the desired tension has been applied to each of the cables 16' and 16", they may be cut so that excess cable extending above the anchor means 17 supported on the plate 21 is removed.

Attention is directed to FIG. 5 of the drawings wherein one suitable form of the anchor means 17 is illustrated and is shown as including a cylindrical housing 50 which has a tapered bowl formed therein. The segmented jaws 51 are provided with an annularly tapered surface which conforms with the tapered bowl in the cylindrical housing 50, and segmented jaws may be held together by means of the resilient band 53. Serrations or teeth 52 on the segmented jaws 51 are adapted to engage the cables, which as illustrated in the drawings, is cable 16' and thereby lock or hold the cable after the tension has been applied thereto.

It will be noted that in the form of the invention described in FIGS. 1 and 4, the cables 16' and 16" extend longitudinally of the member 11 and across the abutting juncture of the members 11 and 13 as noted hereinabove. Also, the members 16' and 16" extend eccentrically and parallel to the longitudinal axis of the member 11. This places a compressive stress between the members 13 and 11 in a desired manner which forms a connection between the members 11 and 13 of substantial strength and which initially prestresses the members 11 and 13 in relation to the load to be carried thereon so that before the members are placed under load, the initial prestressing formed by reason of the connection hereinabove described must be overcome.

In FIG. 6 of the drawings, a framework 60 of a structure is represented wherein the upright member 11 is substantially in vertical relationship relative to the ground, and the lateral member 13 is substantially at 90° relative to the member 11. In this configuration, the cable means 16 is illustrated as extending longitudinally and concentrically of the member 11 rather than eccentrically as described with regard to the modification of the invention shown in FIG. 4 of the drawings. Also, it is to be noted that in the FIG. 6 arrangement, the support plates on the edges of the member 13 have been eliminated, and washers 45 are shown as being mounted directly on the edges 22 of the members 13 and 41 of the member 11 with the holding means 17 then supported on the washers 45. In some instances, the support plates 21 and 23 may be eliminated and smaller support members, such as washers 45, mounted on the members 13 and 11 for receiving and supporting the anchoring means 17 thereon.

It can be appreciated from the foregoing description that the present invention provides a means of forming a connection in the framework of a structure, which connection can be quickly and easily formed with a minimum of effort and which eliminates some of the bulky metal connections heretofore used in such constructions.

Also, the connection of the present invention in extending through the members 11 and 13 and across their abutting juncture is retained out of sight which is of particular advantage in some architectural considerations.

The present invention has particular advantage also in that it enables relatively bulky structures or portions of structures to be transported in sections and then assembled at the job site. For example, in FIG. 2, a bowstring truss represented generally by the numeral 100 is illustrated as being formed of wood. The truss is shown as being formed in two half sections 101 and 102 which are to be connected together to form the truss 100. The arch member 103 may be connected by plates 104 on each side thereof, which plates may then be secured together on the arch 103 by bolts 105 extending through the plates 104 and the arch 103. The tie member 106 which connects each end of the arch 103 may be connected by means of a cable 16 extending longitudinally and concentrically therethrough and which is held at each end of the tie by suitable means such as a washer 45 mounted on each end of the tie 106. It can be appreciated that a hole or opening will be provided through the tie 106 for receiving the cable means 16. After the cable means 16 has been threaded through the opening in the tie 106, a suitable tension can be applied thereto by a jack (not shown) whereupon the jaw segments 51 may be forced to engage the tensioned cable 16 and the cable means 16 then clipped so as to hold the abutting edges 110 and 111 of the member 106 under compression. The truss 100 can then be used in any structural arrangement for which it was originally intended. However, it can be appreciated that by cutting the truss 100 into two half sections, it can be easily transported on a truck or other vehicle to the job site.

FIG. 3 illustrates still another structure which may be somewhat difficult to transport, and the present invention provides a means for forming a connection in this structure also. One member is illustrated at 120, and the other portion of the member is illustrated at 121. After the members 120 and 121 are at the job site, the cable means 16 may be positioned through suitable openings extending longitudinally of each of the members 120 and 121, and its ends then grasped by a holding means 17 similar to that previously described herein. The holding means 17 may be carried on a support such as a washer so as to distribute the load over a larger surface area on the end of each of the members 120 and 121 to thereby inhibit driving the holding means 17 into the wood as tension is applied to the cable means 16.

After the two portions 120 and 121 have been abutted together so that their abutting edges 123 and 124 are interfitted, a tension may be applied to the cable means 16, and this in turn places the abutting juncture of the members 120 and 121 under compression and serves to connect them rigidly together.

It can be appreciated that the present invention is particularly advantageous in that it enables a connection to be formed between wood members which is difficult to accomplish in other ways. It eliminates the necessity of providing bulky, expensive connections for wood members, which connections may be totally undesirable from an architectural point of view. Also, most connections for wood members by reason of their size are extremely difficult to manipulate and mount in place.

The present invention overcomes all of these objections and provides a connection for wood members which can be quickly and easily effected and does not interfere with the surrounding architecture of the structure.

The connection itself is invisible and yet provides a connection which is of suitable strength to accomplish the results desired.

Additionally, the connection of the present invention retains the abutting wood members in which it is used in the same relationship even though periodic application of lateral forces and application of vertical forces to the structure in which the connection is used may occur. The connection will remain rigid and cohesive under all normal loading conditions for which the connection was designed.

It can be appreciated that the drawings illustrate one form of the invention, and various changes and modifications can be made therein without departing from the scope of the invention.

What is claimed is:

1. In a frame construction comprising an elongated wooden lateral member supported near each of its ends by an elongated wooden upright member, said lateral member having a top and a bottom edge, said upright members having an upper and a lower end and providing the sole support for said lateral member, said bottom edge of said lateral member abutting the upper end of said upright members, a top support plate on the top edge of said lateral member having a hole therethrough, and a lower support plate on the lower end of said upright members having a hole therethrough, stressing means comprising a cable having a lower end anchor bearing against said lower support plate and extending through said lower support plate and longitudinally through said upright members, across the abutting juncture of the wooden members, through said lateral member and through said upper support plate against which the upper end of said cable is anchored and bears against thereby allowing a predetermined stress to be put in said cable whereby an area of high compression and moment resistance occurs at the abutting juncture of the wood members.

2. The structure of claim 1 wherein the cable is offset from the central longitudinal axis of said upright member in a direction away from the other of said upright members thereby increasing the moment resistance of the frame construction.

3. The structure of claim 1 wherein the stressing means includes a plurality of spaced cables and said frame construction is provided therefor.

4. The structure of claim 1 wherein an additional support plate having a hole therein is located in the abutting juncture of the wood members and through which said cable extends.

5. The structure of claim 4 wherein a hollow cylindrical member surrounds said cable and extends between and is secured at its ends to said upper support plate and said additional support plate thereby limiting the stress in said lateral wood member.

6. The structure of claim 5 wherein the stressing means includes a plurality of spaced cables and said frame construction is provided therefor.

References Cited by the Examiner

UNITED STATES PATENTS

| 312,375 | 2/1885 | Orr | 52—228 |
|---|---|---|---|
| 1,185,871 | 6/1916 | Broughton | 52—583 XR |
| 2,180,866 | 11/1939 | Cryer | 52—223 XR |
| 2,218,705 | 10/1940 | Faber | 52—327 XR |
| 2,255,511 | 9/1941 | Muller | 52—206 |
| 2,372,200 | 3/1945 | Hayes | 52—259 |
| 2,420,427 | 5/1947 | Henderson | 52—587 |
| 2,786,349 | 3/1957 | Coff | 52—223 |
| 2,803,856 | 8/1957 | Kofahl | 52—227 |
| 2,863,292 | 12/1958 | Coyne | 61—33 |
| 2,943,366 | 7/1960 | Sanford | 52—73 |

FOREIGN PATENTS

| 604,463 | 8/1960 | Canada. |
|---|---|---|
| 78,520 | 7/1955 | Holland. |

OTHER REFERENCES

Civil Engineering, June 1953, p. 45. (Copy of page 45 in Gp. 420.)

Prefabrication, May 1956, p. 306. (Copy of page 306 in Gp. 420.)

FRANK L. ABBOTT, *Primary Examiner.*

JACOB L. NACKENOFF, EARL J. WITMER, *Examiners.*

ROBERT A. STENZEL, *Assistant Examiner.*